(12) United States Patent
Moon et al.

(10) Patent No.: US 6,844,906 B2
(45) Date of Patent: Jan. 18, 2005

(54) LIQUID CRYSTAL DISPLAY DEVICE AND FABRICATING METHOD THEREOF, AND REWORKING METHOD OF ALIGNMENT FILM USING THE SAME

(75) Inventors: Kyo Ho Moon, Daegu-shi (KR); Yong In Park, Seoul (KR)

(73) Assignee: LG. Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/698,551

(22) Filed: Nov. 3, 2003

(65) Prior Publication Data

US 2004/0091641 A1 May 13, 2004

Related U.S. Application Data

(62) Division of application No. 10/005,867, filed on Dec. 7, 2001, now Pat. No. 6,683,668.

(30) Foreign Application Priority Data

May 24, 2001 (KR) ..................................... P2001-28756

(51) Int. Cl.[7] ..................... G02F 1/1337; G02F 1/1333

(52) U.S. Cl. ..................... 349/123; 349/138; 349/42
(58) Field of Search ................................. 349/123, 138, 349/187, 42

(56) References Cited

U.S. PATENT DOCUMENTS

| | | | |
|---|---|---|---|
| 5,488,497 A | 1/1996 | Takanashi et al. | 349/122 |
| 5,815,223 A | 9/1998 | Watanabe et al. | 349/42 |
| 5,886,761 A * | 3/1999 | Sasaki et al. | 349/122 |
| 6,081,315 A | 6/2000 | Matsuyama et al. | 349/143 |
| 6,493,052 B1 | 12/2002 | Satake et al. | 349/114 |
| 6,556,261 B1 * | 4/2003 | Krusius et al. | 349/73 |

* cited by examiner

*Primary Examiner*—Toan Ton
(74) *Attorney, Agent, or Firm*—Morgan Lewis & Bockius LLP

(57) ABSTRACT

A liquid crystal display device includes a substrate, an organic insulating film formed on the substrate, an alignment film having a first etch rate formed on the organic insulating film, and a silicon nitride layer having a second etch rate formed between the alignment film and the organic insulating film, wherein the first etch rate is different from the second etch rate.

9 Claims, 9 Drawing Sheets

LIQUID CRYSTAL DISPLAY DEVICE AND FABRICATING METHOD THEREOF, AND REWORKING METHOD OF ALIGNMENT FILM USING THE SAME

This is a divisional application of application Ser. No. 10/005,867, filed on Dec. 7, 2001, now U.S. Pat. No. 6,683,668 which is incorporated by reference herein in its entirety. The present invention claims the benefit of Korean Patent Application No. P2001-28756 filed in Korea on May 24, 2001, which is hereby incorporated by reference.

BACKGROUND OF THE INVENTION

1. Field of the Invention

The present invention relates to a display device and method of fabricating the same, and more particularly to a liquid crystal display device and a fabricating method thereof, and a reworking method of alignment film using the same.

2. Discussion of the Related Art

In general, a liquid crystal display device controls light transmissivity of liquid crystal molecules by application of an electric field, thereby displaying an image. The liquid crystal display device includes a liquid crystal display panel where liquid crystal cells are arranged in a matrix configuration, and a driving circuit is provided for driving the liquid crystal display panel. The liquid crystal display panel has a common electrode and pixel electrodes for applying an electric field to each of the liquid crystal cells. Generally, the pixel electrodes are formed on a lower substrate within liquid crystal cells and the common electrode is formed on an entire surface of a upper substrate. Each of the pixel electrodes is connected to a switching device such as a thin film transistor (TFT), for example, and together with the common electrode, drive the liquid crystal cell according to a data signal supplied through the TFT.

FIGS. 1 and 2 show a liquid crystal display device according to the conventional art. In FIG. 1, the conventional liquid crystal display device includes a black matrix 32 that is sequentially formed on an upper substrate 11, an upper plate UG comprising a color filter 30 and a transparent electrode 28, a TFT that is formed on a lower substrate 1, a lower plate DG comprising a pixel electrode 22, and a spacer 26 formed for preparing an inner space to have liquid crystal molecules injected between the upper plate UG and the lower plate DG. The black matrix 32 is formed on the upper substrate 11 in matrix configuration to divide a surface of the upper substrate 11 into a plurality of cell areas. Color filters are formed in each of the plurality of cell areas to prevent light interference between adjacent cell areas. Color filters 30 of red, green and blue are sequentially formed on the upper substrate 11 where the black matrix 32 is formed. Accordingly, each of the color filters 30 is formed by spreading a material, which absorbs white light and only transmits light of a specific wavelength, i.e., red, green or blue, on an entire surface of the upper substrate 11 where the black matrix 32 is formed, and then patterning the material. A material for forming the transparent electrode 28 is spread on the upper substrate 11 where the black matrix 32 and the color filter 30 are formed, thereby completing the upper plate UG.

In FIG. 2, on the lower plate DG, the TFT that drives the liquid crystal cell is formed at an intersection of a gate line 2 and a data line 4. The pixel electrodes 22 overlap adjacent portions of the gate line 2 and the data line 4 that are arranged in a matrix configuration formed on the lower substrate 1.

FIGS. 3A–3E show a fabrication process of a portion of the liquid crystal display device along A–A' of FIG. 2.

In FIG. 3A, a gate metal film is formed on a lower substrate 1, and then patterned to form a gate line 2 and a gate electrode 6.

In FIG. 3B, an nsulating material is deposited on an entire surface of the lower substrate 1 for covering the gate line 2 and the gate electrode 6, thereby forming a gate insulating film 12. First and second semiconductor materials are sequentially deposited on the gate insulating film 12, and subsequently patterned, thereby forming an active layer 14 and an ohmic contract layer 16.

In FIG. 3C, a data metal film is formed on the gate insulating film 12, and then patterned, thereby forming a data line 4, a source electrode 8, and a drain electrode 10. The ohmic contact layer 16 is then etched exposing a channel portion of the active layer 14. The channel portion of the active layer 14 corresponds to the gate electrode 6 between the source electrode 8 and the drain electrode 10.

In FIG. 3D, a protective film 18 of an organic material is deposited on the gate insulating film 12 and then planarized using spin coating technique, The protective film 18 is then patterned, thereby forming a contact hole 20 exposing a portion of the drain electrode 10.

In FIG. 3E, a transparent conduction material is formed on the protective film 18, and then patterned, thereby forming a pixel electrode 22 that is electrically connected to the drain electrode 10 via the contact hole 20. An alignment film 24 (of FIG. 1) is formed on an entire surface of the lower substrate 1 where the pixel electrode 22 is formed. A rubbing process is performed to complete the lower plate DG. Next, as shown in FIG. 1, the upper plate UG and the lower plate DG are bonded together with a spacer 26 of spherical shape positioned along a periphery therebetween. Finally, liquid crystal molecules are injected in a cavity between the bonded upper and lower plates UG and DG, thereby completing the liquid crystal display device.

However, after formation of the protective film 18, a significant amount of time passes before the pixel electrode 22 is formed, and contaminants are absorbed by the surface of the protective film 18. Accordingly, the alignment film 24 is poorly formed on the contaminated surface of the protective film 18.

FIG. 4 shows the result of a poorly formed alignment film 36 on a contaminated surface of a protective film 18. Accordingly, processing is performed for reworking the poorly formed alignment film 36 using a dry-etching technique.

FIG. 5 shows the result of performing the rework processing. First, the lower plate DG is mounted in a chamber, and $O_2$, $O_2+Cl_2$, $CF_4$, $SF_6$ gases are injected into the chamber, thereby generating a plasma discharge. Then, the alignment film 36 is etched to be completely removed from the pixel electrode and protective film 18 by reaction between the injected gas and the alignment film 36. However, because the alignment film 36 and the protective layer 18 have similar dry-etching rates, the protective film (18) becomes over-etched in regions A. Accordingly, since the rework processing of the alignment film causes over-etching of the protective film 18, device yield and productivity are significantly decreased.

SUMMARY OF THE INVENTION

Accordingly, the present invention is directed to a liquid crystal display device and a fabricating method thereof, and a reworking method of alignment film using the same that substantially obviates one or more of the problems due to limitations and disadvantages of the related art.

An object of the present invention is to provide a liquid crystal display device and a method of fabricating the same where an alignment film having irregularities or defects may be removed without effecting an underlying material layer.

Another object of the present invention is to provide a method of reworking an alignment film of a liquid crystal display device.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device includes a substrate, an organic insulating film formed on the substrate, an alignment film having a first etch rate formed on the organic insulating film, and a silicon nitride layer having a second etch rate formed between the alignment film and the organic insulating film, wherein the first etch rate is different from the second etch rate.

In another aspect, a method of fabricating a liquid crystal display device includes forming an organic insulating film on a substrate, forming an alignment film having a first etch rate on the organic insulating film, and forming a silicon nitride layer having a second etch rate between the alignment film and the organic insulating film, wherein the first etch rate is different from the second etch rate.

In another aspect, a method of reworking an alignment film of a liquid crystal display device includes forming an organic protective film on a substrate, forming a silicon nitride layer having a first etch rate on the organic protective film, forming a first alignment film on the silicon nitride layer, detecting at least one irregularity of the first alignment film formed on the silicon nitride layer, eliminating the first alignment film with a second etch rate different from the first etch rate of the silicon nitride layer, and forming a second alignment film on the silicon nitride layer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are intended to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
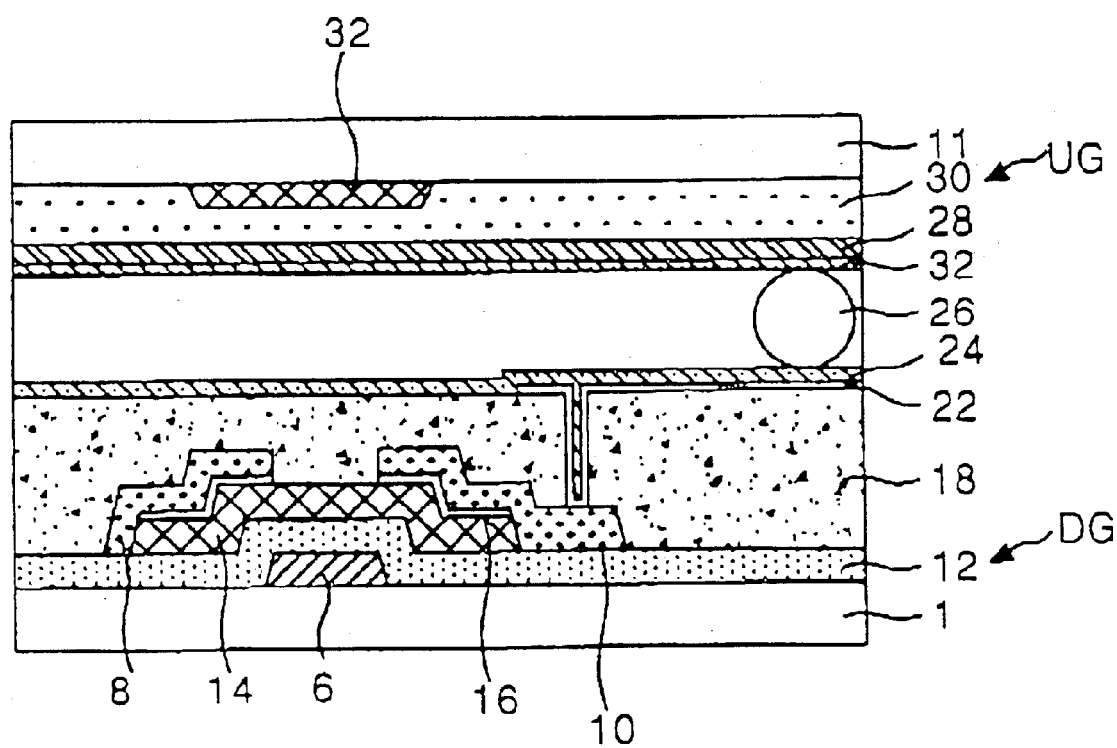
FIG. 1 is a cross sectional view of a liquid crystal display device according to the conventional art.
Figure 2:
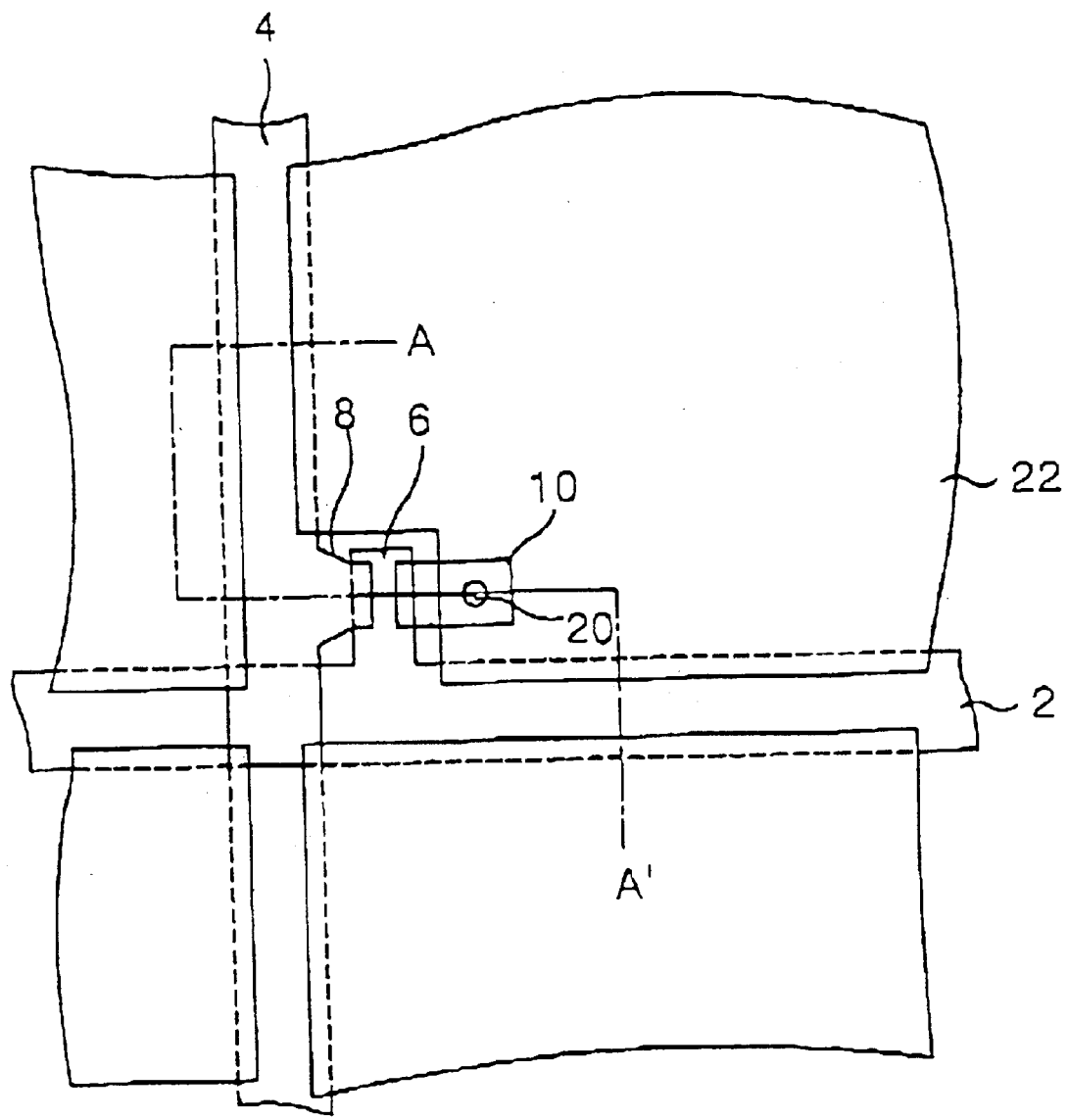
FIG. 2 is a plan view of a lower substrate of the liquid crystal display device shown in FIG. 1.
Figure 3A:
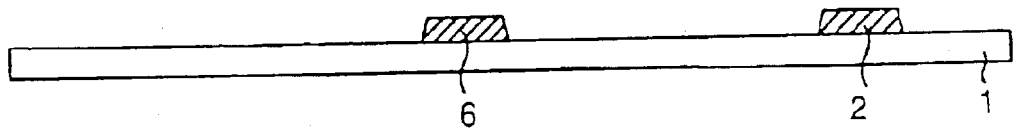
FIGS. 3A to 3E are cross sectional views of a fabricating method of the lower substrate of the liquid crystal display device along A–A' of FIG. 2.
Figure 3B:
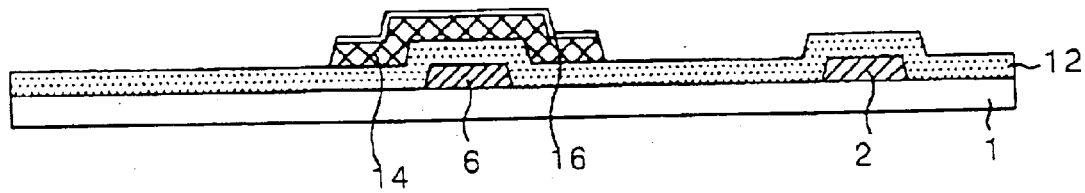
Figure 3C:
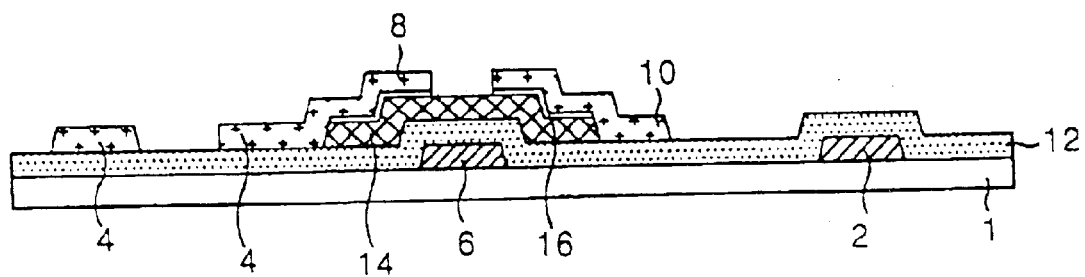
Figure 3D:
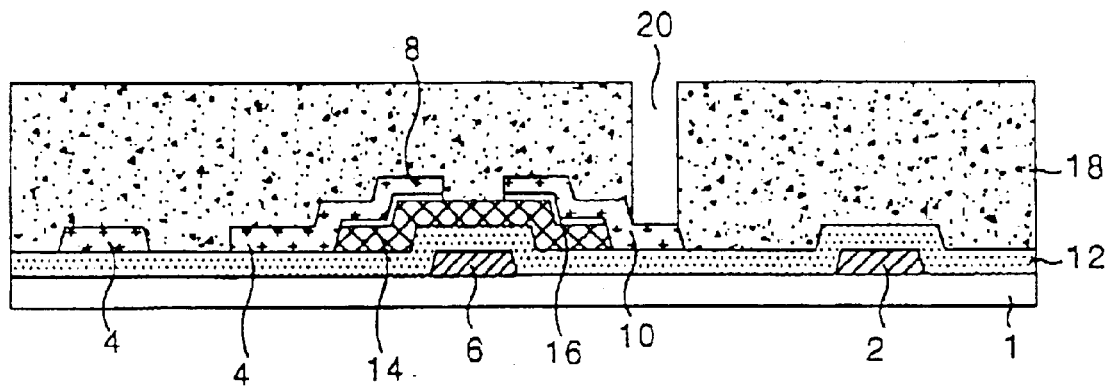
Figure 3E:
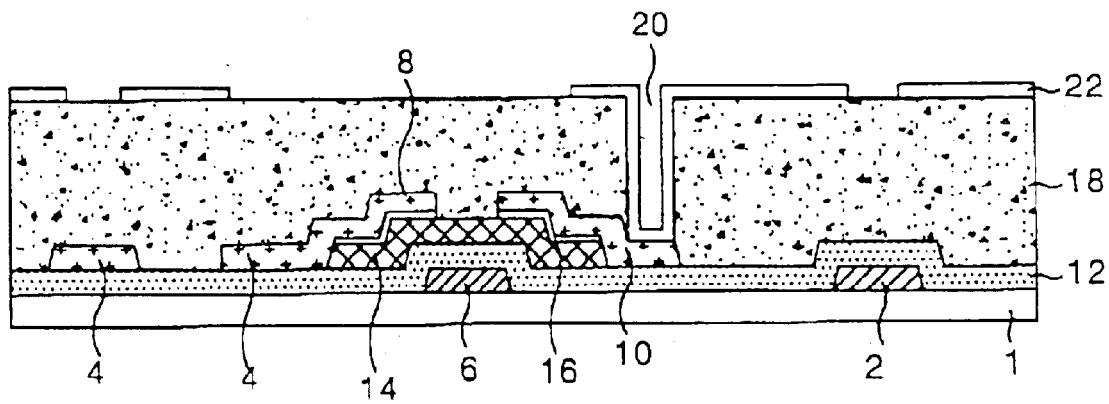
Figure 4:
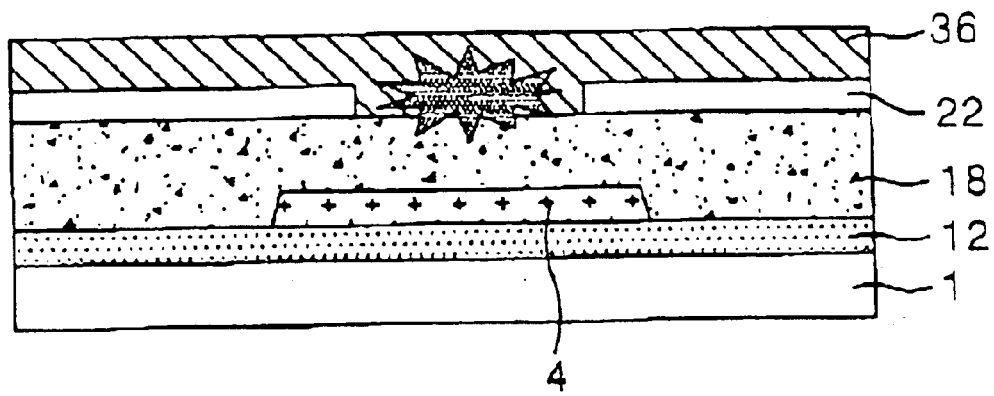
FIG. 4 is a cross sectional view of a portion of the liquid crystal display device of FIG. 1, showing an alignment film.
Figure 5:
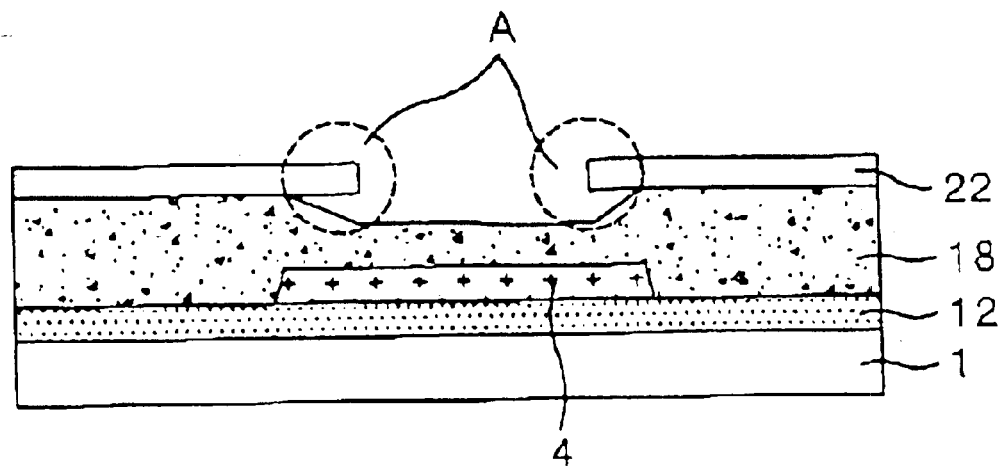
FIG. 5 is a cross sectional view of an over-etched protective film shown in FIG. 4.
Figure 6:
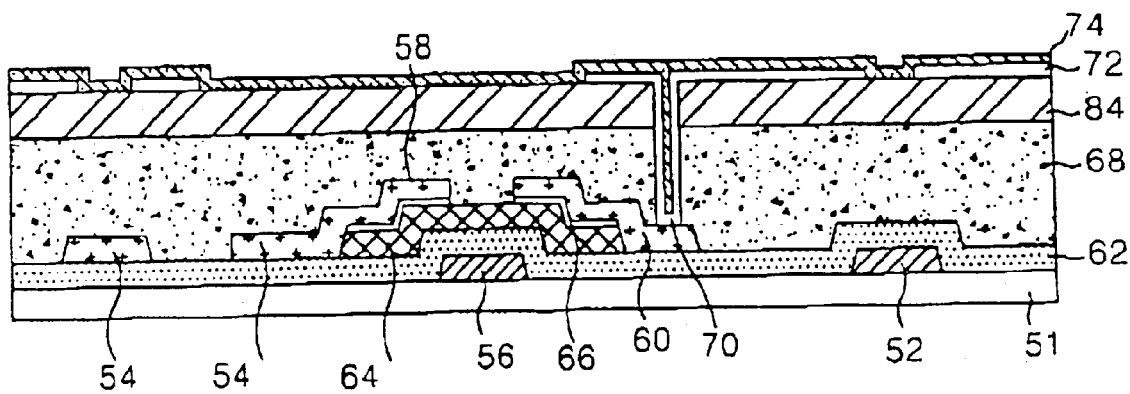
FIG. 6 is a cross sectional view of an exemplary liquid crystal display device according to the present invention.

FIG. 6 is a cross sectional view of a liquid crystal display device according to the present invention. In FIG. 6, a thin film transistor (TFT) may include a gate electrode 56, an active layer 64, and an ohmic contact layer 66 sequentially deposited, for example, on a portion of a gate insulating film 62 disposed above the gate electrode 56. A source electrode 58 and a drain electrode 60 may be separately formed on the ohmic contact layer 66. A first protective layer 68 and a second protective layer 84 may be formed over the TFT. The first protective layer 68 may be formed of an organic insulating material, and the second protective layer 84 may be formed of an inorganic insulating material. For example, the second protective layer 84 may be formed of hydrogenated silicon nitride (H—SiNx) to increase adhesive strength with the organic insulating material of the first protective layer 68. A pixel electrode 72 includes a first portion that may be formed on a top portion of the second protecting layer 84 and a second portion that may contact the drain electrode 60 through a contact hole 70 that penetrates the first and second protective layers 68 and 84.

Further in FIG. 6, a gate line 52 is formed on the substrate 51 upon which the gate insulating film 62 and the first and the second protective layers 68 and 84 are formed. The gate line 52 supplies a gate signal to the gate electrode 56 of the TFT. An alignment film 74 may be formed to cover the TFT, gate line, and data line. The alignment film may be formed of polyimide, for example, for determining an initial molecule arrangement. Accordingly, since the alignment film 74 has an etch rate different from the etch rate of the second protective film 84, the alignment film 74 may be eliminated without any loss of the first and the second protective layers 68 and 84. Thus, the alignment film 74 may be reworked without causing damage to the underlying first protective layer 68.

Figure 7A:
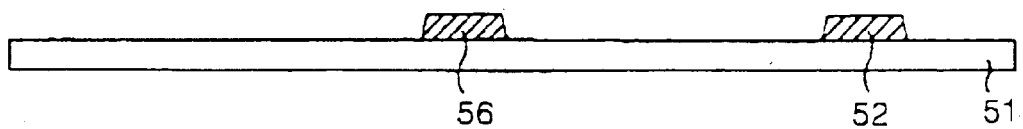
FIGS. 7A to 7E are cross sectional views showing an exemplary fabricating method of a lower substrate of the liquid crystal display device of FIG. 6.

FIGS. 7A to 7F show an exemplary fabricating method of the liquid crystal display device of FIG. 6. In FIG. 7A, a first material may be deposited to form the gate line 52 and the gate electrode 56 on the lower substrate 51. The first material may include at least one of Aluminum (Al) and Copper (Cu), for example, deposited on the lower substrate 51 by a sputtering technique, for example, and then subsequently patterned to form the gate line 52 and the gate electrode 56.

Figure 7B:
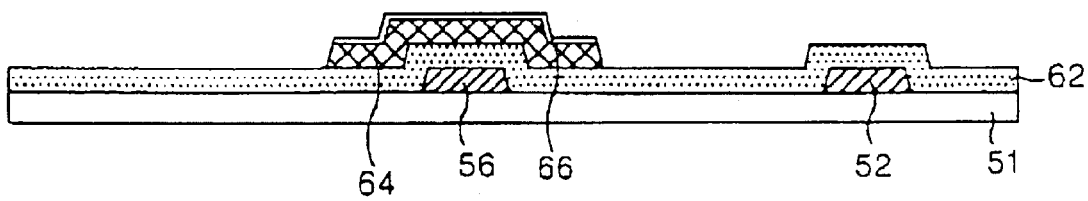

In FIG. 7B, the active layer 64 and the ohmic contact layer 66 may be formed on the gate insulating film 62. The gate insulating film 62 may include an insulating material deposited on an entire surface of the lower substrate 51 by plasma enhanced chemical vapor deposition PECVD technique, for example, to cover the gate line 52 and the gate electrode 56. The insulating material includes at least one of silicon nitride (SiNx) and silicon oxide (SiOx), for example. A first semiconductor layer and a second semiconductor layer may be deposited on the gate insulating film 62 and then patterned, thereby forming the active layer 64 and the ohmic contact layer 66. The first semiconductor layer includes at least undoped amorphous silicon, and the second semiconductor layer includes at least amorphous silicon doped with an impurity of N-type or P-type, for example.

Figure 7C:
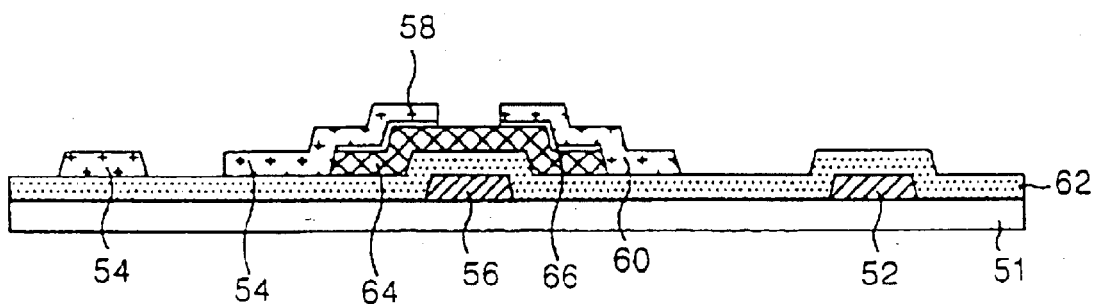

In FIG. 7C, a metal material such as Chromium (Cr) or molybdenum (Mo), for example, may be deposited on an entire surface of the gate insulating film 62 by CVD technique or sputtering technique, for example, and then patterned to form the data line 54, the source electrode 58 and the drain electrode 60. After forming the source and drain electrodes 58 and 60, a portion of the ohmic contact layer 66 corresponding to the gate electrode 56 is patterned to expose a channel portion of the active layer 64.

Figure 7D:
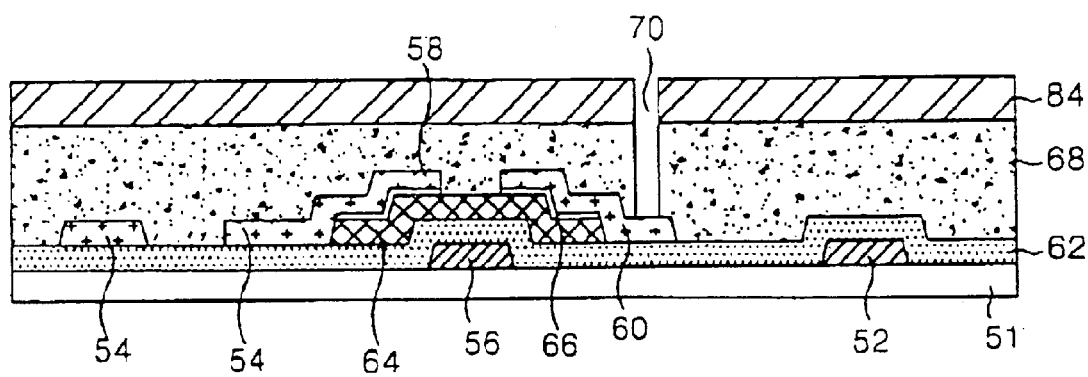

In FIG. 7D, a first insulating material and a second insulating material may be sequentially deposited on the gate insulating layer 62 to cover the data line 54, the source electrode 58 and the drain electrode 60, and then patterned to form the first protective layer 68 and the second protective layer 84. The first protective layer 68 may be formed of an organic insulating material having a small dielectric constant, such as an acrylic organic compound, Teflon, benzocyclobutene (BCB), cytop, and perfluorocyclobutane (PFCB), for example. The contact hole 70 may be formed to penetrate the first and second protective layers 68 and 84 to expose a surface portion of the drain electrode 60.

The second protective layer 84 may be formed of silicon nitride (SiNx) or inorganic insulating material, for example, having a etching rate different from an etching rate of the alignment film 74 that will be formed later. The silicon nitride(SiNx) may include an amount of hydrogen (H), thereby strengthening an adhesive bond to the first protective layer 68.

Figure 7E:
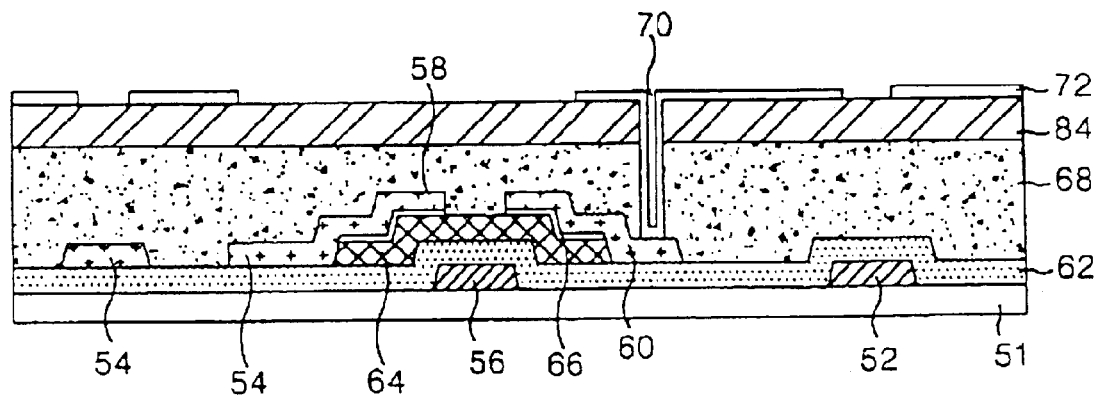

In FIG. 7E, a transparent conductive material such as indium-tin-oxide(ITO), indium-zinc-oxide(IZO) or indium-tin-zinc-oxide(ITZO), for example may be deposited on the second protective layer 84, and then patterned to form the pixel electrode 72. The pixel electrode 72 electrically contacts the drain electrode 60 through the contact hole 70. The pixel electrode 72 may be formed to overlap the gate line 52 with the gate insulating film 62, the first protective layer 68, and the second protective layer 84 sandwiched therebetween. Furthermore, the pixel electrode 72 may be formed to overlap the data line 54 with the first protective layer 68 and the second protective layer 84 sandwiched therebetween.

Figure 8:
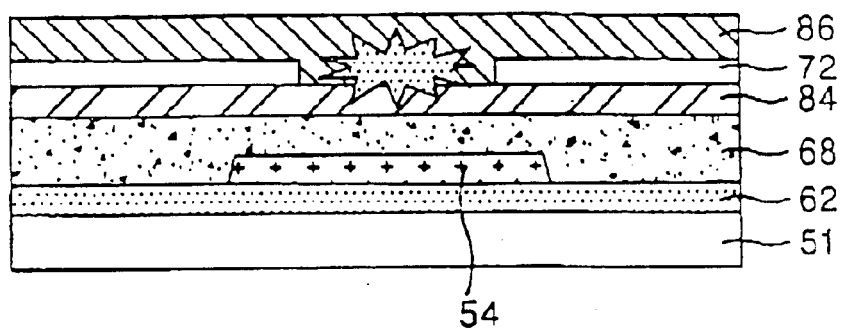
FIG. 8 is a cross sectional view showing an alignment film of the liquid crystal display device of FIG. 6.

Finally, the alignment film such as polyimide, for example, may be formed on an entire surface of the lower substrate on which the pixel electrode 72 is formed. Then, a rubbing process is performed to complete the lower plate. Accordingly, if a poorly formed alignment film 86 is detected, as shown in FIG. 8, from a result of testing the lower plate where the alignment film 74 is formed, the process for reworking the alignment film 74 may be performed.

Figure 9:
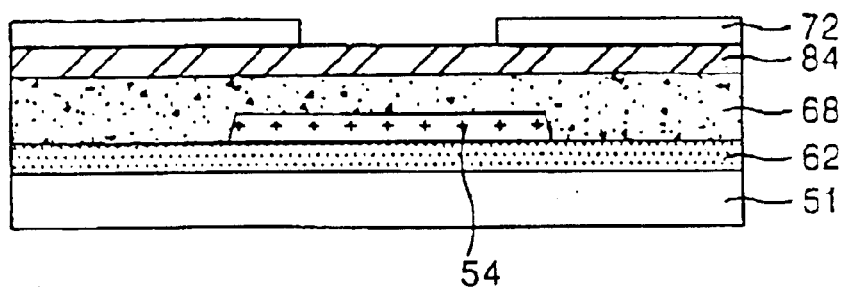
FIG. 9 is a cross sectional view of the liquid crystal display device after removing the alignment film of FIG. 8.

In FIG. 9, the poorly formed alignment film 86 may be eliminated by using a dry-etching technique, for example, wherein the lower plate is placed within a chamber, and at least one of SF6, O2, O2+Cl2, and CF4 gas is injected into the chamber, thereby generating a plasma discharge. Accordingly, the gas injected into the chamber is generally injected in the ratio greater than or equal to $SF_6:O_2=1:50$, and the most desirable case is a ratio that is greater than or equal to $SF_6:O_2=1:70$, wherein a radio frequency (RF) power is about 500~1500 W. Then, the poorly formed alignment film 86 can be entirely etch away without any loss of the first and the second protective layers 68 and 84.

Figure 10:
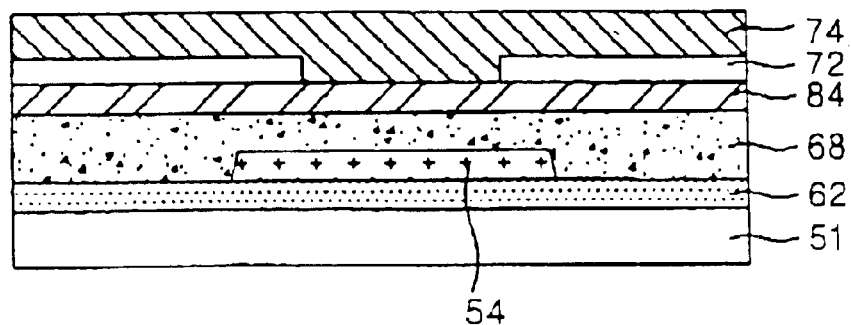
FIG. 10 is a cross sectional view of a reworked alignment film of the liquid crystal display device according to the present invention.

In FIG. 10, after elimination of the poorly formed alignment film 86, the lower substrate 51 is conveyed to form the alignment film 74, thereby completing the rework processing.

It will be apparent to those skilled in the art that carious modifications and variations can be made in the liquid crystal display device and fabricating method thereof, and reworking method of alignment film of the present invention without departing from the spirit or scope of the invention. Thus, it is intended that the present invention cover the modifications and variations of this invention provided they come within the scope of the appended claims and their equivalents.

What is claimed is:

1. A method of fabricating a liquid crystal display device, comprising the steps of:
   forming an organic insulating film on a substrate;
   forming an alignment film having a first etch rate on the organic insulating film; and
   forming a silicon nitride layer having a second etch rate between the alignment film and the organic insulating film,
   wherein the first etch rate is different from the second etch rate.

2. The method according to claim 1, further including eliminating the alignment film by dry-etching during rework processing.

3. The method according to claim 2, wherein the dry-etching is carried out by using at least one compound gas of $SF_6$, $O_2+Cl_2$, and $CF_4$.

4. The method according to claim 3, wherein a ratio of the compound gas is at least about $SF_6:O_2=1:50$.

5. The method according to claim 3, wherein a ratio of the compound gas is at least about $SF_6:O_2=1:70$.

6. The method according to claim 3, wherein the dry-etching uses a radio frequency power of about 500–1500 W.

7. The method according to claim 1, wherein the silicon nitride layer includes hydrogen.

8. The method according to claim 1, further including the steps of:
   forming a gate line and a gate electrode on the substrate;
   forming a gate insulating film on the gate line, the gate electrode and the substrate;
   forming a semiconductor layer on the gate insulating film; and
   forming a data line, a source electrode and a drain electrode on the gate insulating film.

9. The method according to claim 8, further including the step of forming a pixel electrode on the silicon nitride layer to overlap at least one of the data line and the gate line.

* * * * *